J. C. COPELAND.
ATTACHMENT FOR PLOWS.
APPLICATION FILED DEC. 7, 1917.
1,283,679.
Patented Nov. 5, 1918.
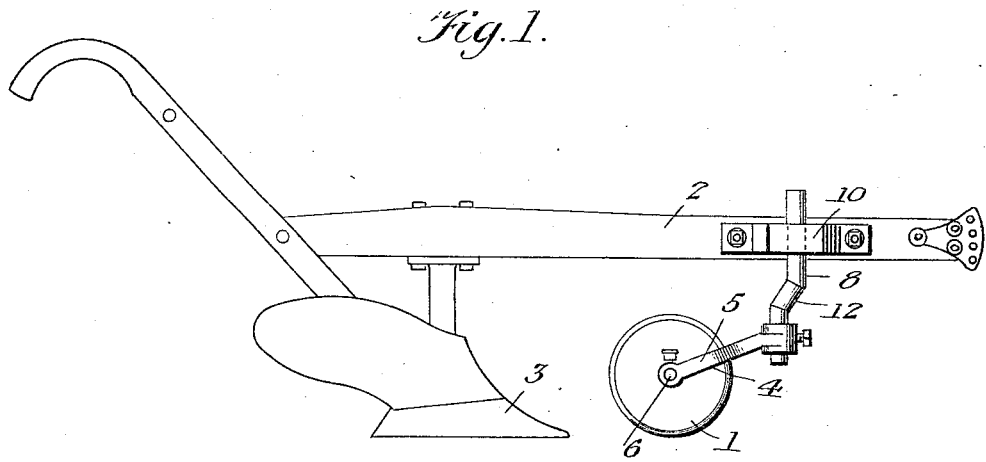
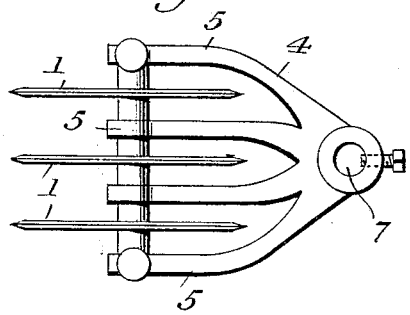
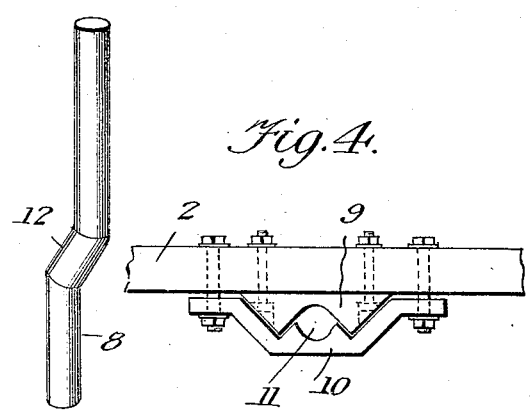
Inventor
J. C. Copeland
Witnesses
By Victor J. Evans
Attorney

UNITED STATES PATENT OFFICE.

JOHN CALVIN COPELAND, OF PIQUA, OHIO.

ATTACHMENT FOR PLOWS.

1,283,679.   Specification of Letters Patent.   Patented Nov. 5, 1918.

Application filed December 7, 1917. Serial No. 206,046.

*To all whom it may concern:*

Be it known that I, JOHN C. COPELAND, a citizen of the United States, residing at Piqua, in the county of Miami and State of Ohio, have invented new and useful Improvements in Attachments for Plows, of which the following is a specification.

This invention relates to new and useful improvements in attachments for plows and the principal object of the invention is to provide a series of cutting disks located in front of the plow-share for breaking up the ground in front of said share.

Another object of the invention is to provide a novel arrangement of parts for supporting the disks from the plow beam.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the invention applied to a plow.

Fig. 2 is a plan view of the disk supporting frame.

Fig. 3 is a view of the post for connecting the frame to the beam.

Fig. 4 is a detail view of the means for connecting the post to the beam.

As shown in these views a series of disks 1 are secured to the plow beam 2 so that they will contact with the ground in front of the plow share 3. The drawing shows three of these disks mounted in the frame 4, said frame having a plurality of rearwardly extending members 5 which carry the shaft 6 at their rear ends. This shaft carries the disks, each disk being located between a pair of rearwardly extending members. These members are supplied with the usual oil cups whereby the shaft may be lubricated. As shown the frame tapers toward its front end which is provided with a hole 7 through which the lower end of the post 8 extends and is suitably secured therein. The upper end of this post is removably secured to the beam by a clamping device which consists of two members. The member 9 is bolted to the side of the plow beam and is provided with a V-shaped projection at each end thereof and the space between said projections being curved to form a bearing for the post. The other member 10 of the clamp is provided with a pair of recesses of substantially V-shape for engaging the projections on the member 9 but the inner adjacent walls of these recesses are cut away and the space between them forms a curved recess 11 which coöperates with the curved recess in the part 9 to form a complete bearing for the post. The member 10 is also bolted to the beam and it will be seen that by tightening the bolts thereof the members will clamp the post in position. The post is provided with an intermediate bend 12 for throwing the disk in front of the plow share. It will be seen that by turning the bolt the position of the disk may be adjusted in relation to the plow share.

It will thus be seen that the ground in front of the plow will be thoroughly broken up before being turned over by the plow, thus more thoroughly pulverizing the soil at the bottom of the plowed ground.

It is thought from the foregoing description that the advantages and novel features of my invention will be readily apparent.

I desire it to be understood that I may make slight changes in the construction and in the combination and arrangement of the several parts, provided that such changes fall within the scope of the appended claim.

What I claim is:—

In combination with a plow beam and a supporting rod, a member provided with a pair of V-shaped projections having a curved part between them, bolts for securing the member to the beam, a second member, bolts securing the same to the beam, said second member being provided with a pair of V-shaped recesses for receiving the V-shaped projections of the other member, and a curved recess located between said V-shaped recesses and coöperating with the curved part on the other member to form a bearing for the rod.

In testimony whereof I affix my signature.

JOHN CALVIN COPELAND.

Copies of this patent may be obtained for five cents each, by addressing the "Commissioner of Patents, Washington, D. C."